(12) United States Patent
Ng et al.

(10) Patent No.: US 11,670,328 B2
(45) Date of Patent: Jun. 6, 2023

(54) DISK-DRIVE SUSPENSION, ELECTRONIC COMPONENT, AND CONNECTION METHOD OF SUSPENSION AND ELECTRONIC COMPONENT

(71) Applicant: NHK SPRING CO., LTD., Yokohama (JP)

(72) Inventors: Kai Chung Ng, Yokohama (JP); Wen Tao, Yokohama (JP); Zhen Zhou Qi, Yokohama (JP); Jun Zeng, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/736,055

(22) Filed: May 3, 2022

(65) Prior Publication Data
US 2022/0375496 A1 Nov. 24, 2022

(30) Foreign Application Priority Data
May 20, 2021 (CN) .......................... 202110552691.6

(51) Int. Cl.
*G11B 5/48* (2006.01)
(52) U.S. Cl.
CPC ............ *G11B 5/4833* (2013.01); *G11B 5/486* (2013.01); *G11B 5/4826* (2013.01); *G11B 5/4853* (2013.01)
(58) Field of Classification Search
CPC ... G11B 5/4833; G11B 5/4826; G11B 5/4853; G11B 5/486
See application file for complete search history.

(56) References Cited

U.S. PATENT DOCUMENTS

| | | | |
|---|---|---|---|
| 5,530,604 A | | 6/1996 | Pattanaik |
| 5,610,783 A | * | 3/1997 | Maffitt ................. G11B 5/6005 |
| 5,680,275 A | * | 10/1997 | Frater .................. G11B 5/4826 |
| | | | 360/234.5 |
| 5,692,669 A | * | 12/1997 | Sakemi .................. H05K 1/111 |
| | | | 228/180.21 |
| 5,815,347 A | * | 9/1998 | Pattanaik ............. G11B 5/4853 |
| 5,821,494 A | * | 10/1998 | Albrecht .............. G11B 5/4853 |
| | | | 228/111.5 |
| 5,889,636 A | * | 3/1999 | Arya ..................... G11B 5/4833 |
| | | | 360/234.5 |
| 5,949,618 A | * | 9/1999 | Arya ...................... G11B 5/486 |

(Continued)

FOREIGN PATENT DOCUMENTS

| | | |
|---|---|---|
| JP | H07320434 A | 12/1995 |
| JP | H11110925 A | 4/1999 |
| JP | 2013033570 A | 2/2013 |

*Primary Examiner* — Brian E Miller
(74) *Attorney, Agent, or Firm* — Holtz, Holtz & Volek PC

(57) ABSTRACT

A disk-drive suspension includes a load beam, a flexure laid on top of the load beam, a first terminal provided on the flexure, and a first bump arranged on a top surface of the first terminal. The first terminal includes a narrow part having a first width in a first direction and including a center of the first terminal, and a wide part having a second width in the first direction greater than the first width. The wide part and the narrow part are arranged in a second direction intersecting the first direction. The first bump has, at the center, a first height from a bottom surface of the first terminal. The first height is greater than the first width.

14 Claims, 10 Drawing Sheets

(56) References Cited

U.S. PATENT DOCUMENTS

| | | | | |
|---|---|---|---|---|
| 5,956,208 | A * | 9/1999 | Kawazoe | G11B 5/4853 360/234.5 |
| 6,330,132 | B1 * | 12/2001 | Honda | G11B 5/48 360/234.5 |
| 7,567,410 | B1 * | 7/2009 | Zhang | G11B 5/4853 360/245.9 |
| 8,320,084 | B1 * | 11/2012 | Shum | G11B 5/4833 360/245.9 |
| 8,587,901 | B1 * | 11/2013 | Puttichaem | G11B 5/486 360/234.5 |
| 9,368,138 | B2 * | 6/2016 | Inoue | G11B 5/4826 |
| 9,390,737 | B1 * | 7/2016 | Puttichaem | G11B 5/486 |
| 9,728,211 | B1 * | 8/2017 | Murata | G11B 5/4826 |
| 10,460,754 | B2 * | 10/2019 | Matsumoto | G11B 5/4846 |
| 2002/0159196 | A1 * | 10/2002 | Watanabe | G11B 21/02 |
| 2005/0195528 | A1 * | 9/2005 | Bennin | G11B 5/4846 |
| 2007/0279807 | A1 * | 12/2007 | Kobayashi | H05K 3/363 360/264.2 |
| 2009/0080111 | A1 * | 3/2009 | Yao | H05K 3/361 360/234.5 |
| 2009/0086374 | A1 * | 4/2009 | Smith | G11B 5/4826 360/234.5 |
| 2013/0063839 | A1 * | 3/2013 | Matsumoto | G11B 5/4826 360/234.3 |
| 2016/0217814 | A1 * | 7/2016 | Chen | G11B 5/4813 |
| 2016/0270216 | A1 * | 9/2016 | Fujimura | G11B 5/4846 |
| 2016/0322072 | A1 * | 11/2016 | Puttichaem | G11B 5/4826 |
| 2017/0229140 | A1 * | 8/2017 | Murata | G11B 5/4853 |
| 2019/0122694 | A1 * | 4/2019 | Davidson | G11B 5/3109 |
| 2019/0244636 | A1 * | 8/2019 | Matsumoto | G11B 5/4846 |
| 2019/0295600 | A1 * | 9/2019 | Yoshikawa | G11B 5/4853 |
| 2020/0098388 | A1 * | 3/2020 | Davidson | G11B 5/4826 |

* cited by examiner

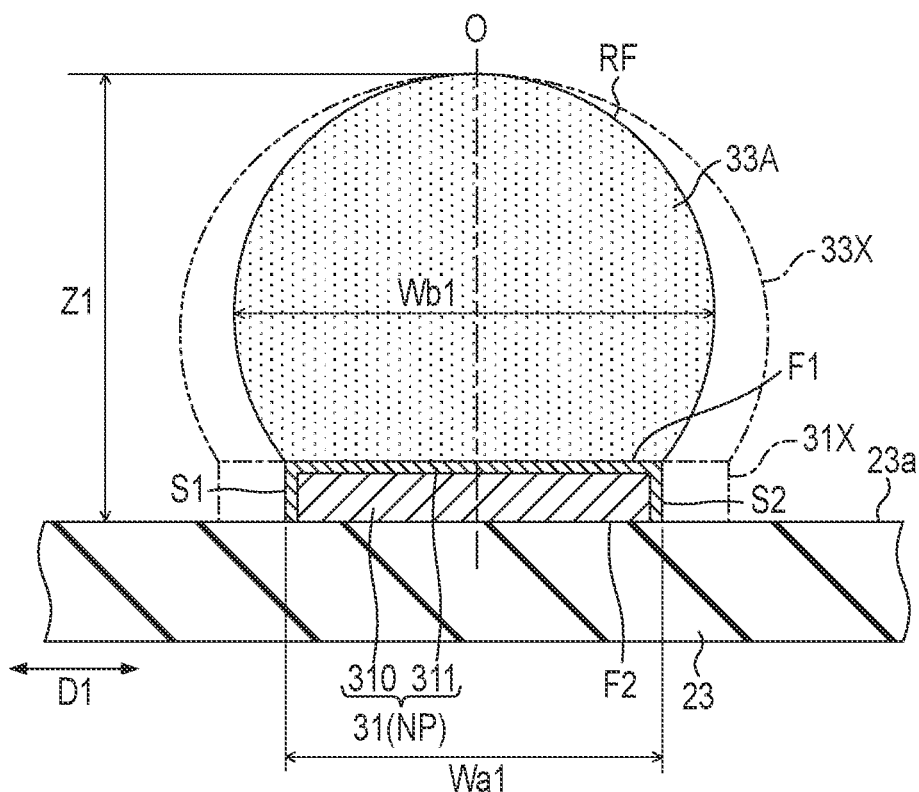
F I G. 9
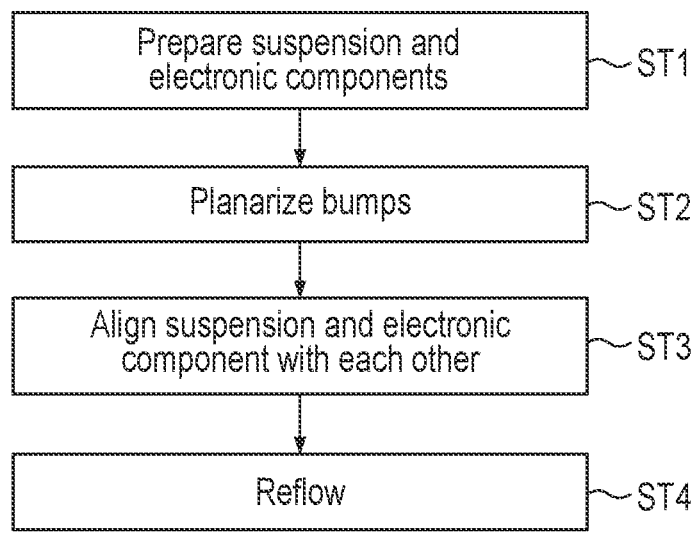
F I G. 10

| [mm] | Example 1 (terminal 31, bump 33A) | Example 2 (terminal 31, bump 33A) | Comparative example (terminal 31X, bump 33X) |
|---|---|---|---|
| Terminal width Wa1 | 0.145 | 0.145 | 0.185 |
| Terminal width Wa2 | 0.185 | 0.215 | 0.185 |
| Bump width Wb1 | 0.205 | 0.193 | 0.229 |
| Bump width Wb2 | 0.303 | 0.275 | 0.337 |
| Bump height Z1 | 0.160 | 0.151 | 0.163 |

DISK-DRIVE SUSPENSION, ELECTRONIC COMPONENT, AND CONNECTION METHOD OF SUSPENSION AND ELECTRONIC COMPONENT

CROSS-REFERENCE TO RELATED APPLICATIONS

This application is based upon and claims the benefit of priority from prior Chinese Patent Application No. 202110552691.6, filed May 20, 2021, the entire contents of which are incorporated herein by reference.

BACKGROUND OF THE INVENTION

1. Field of the Invention

Present invention relates to a disk-drive suspension to be used for a hard disk drive or the like, an electronic component to be mounted on the suspension, and a connection method of the suspension and the electronic component.

2. Description of the Related Art

In an information processing device such as a personal computer, a hard disk drive (HDD) is used. The hard disk drive includes magnetic disks rotating around a spindle, a carriage turning around a pivot shaft, and the like. The carriage includes an actuator arm and is turned around the pivot shaft in a track-width direction of the disk by a positioning motor such as a voice coil motor.

A disk-drive suspension (hereinafter simply referred to as a suspension) is attached to the actuator arm. The suspension includes a load beam, flexure laid on top of the load beam, and the like. A slider constituting a magnetic head is provided on a gimbal section formed in the vicinity of a tip of the flexure. The slider is provided with an element (transducer) configured to carry out read and write of data.

The flexure includes a plurality of wirings. These wirings are connected to terminals (pads) provided on the tip side of the suspension and terminals provided on the tail side thereof. The terminals on the tip side are connected to terminals of the slider with solder. The terminals on the tail side are connected to a flexible printed circuit (FPC) board with solder.

As a method of connecting terminals to each other with solder, a technique described in, for example, JP H07-320434 A and JP H11-110925 A is known. In the method of these literatures, a solder bump is formed on a terminal, the bump is then planarized, and the planarized bump is made close to a terminal which is the connection counterpart. Thereafter, the bump is melted and is joined to the terminal of the connection counterpart. Planarizing the bump enhances the tolerance for alignment of the terminals with each other.

In recent years, with the advancement in high functionality of the suspension, the numbers of the wirings and terminals provided on the flexure are increasing. Concomitantly with this, when the intervals between the terminals are made smaller, a possibility of the bumps formed on the adjacent terminals being short-circuited arises.

As a countermeasure against this, reducing the amount of solder constituting the bump is conceivable. However, in this case, there is a possibility of a defect occurring in the connection of the terminals to each other.

Further in JP H05-67048 U and JP 2013-33570 A, a method of reducing the width of a central part of the terminal in order to reduce the height and width of the central part of the bump is disclosed. However, when the height of the bump is reduced, there is a possibility of the bump not being adequately joined to the bump of the connection counterpart when the bump is planarized and is thereafter melted as described above. Further, the difference in the height between the bump before the planarization and that after the planarization becomes less, and hence the tolerance for alignment of the terminals with each other can be lowered.

BRIEF SUMMARY OF THE INVENTION

As described above, regarding connection of the terminals of the suspension and terminals of the electronic component such as the slider, flexible printed circuit board, and the like to each other, there has been much room for various improvements. Thus, the present invention makes it one of the objects thereof to provide a suspension, an electronic component, and a method of connecting the suspension and the electronic component, all of which make it possible to excellently connect the terminals to each other.

A disk-drive suspension according to one embodiment includes a load beam, a flexure laid on top of the load beam, a first terminal provided on the flexure, and a first bump arranged on a top surface of the first terminal. The first terminal includes a narrow part having a first width in a first direction and including a center of the first terminal, and a wide part having a second width in the first direction greater than the first width. The wide part and the narrow part are arranged in a second direction intersecting the first direction. The first bump has, at the center, a first height from a bottom surface of the first terminal. The first height is greater than the first width.

A connection method according to one embodiment is a connection method of electrically connecting the disk-drive suspension and an electronic component including a second terminal and a second bump arranged on top surfaces of the second terminal to each other. The method comprises planarizing the first bump, aligning the suspension and the electronic component with each other in such a manner that the first bump and the second bump are close to each other, and a first plane including a top surface of the first terminal and a second plane including a top surface of the second terminal intersect each other, and melting the first bump and the second bump to thereby connect the first bump and the second bump to each other.

An electronic component according to one embodiment is electrically connected to a disk-drive suspension. The electronic component comprises a second terminal and a second bump arranged on a top surface of the second terminal. The second terminal includes a narrow part having a first width in a first direction and including a center of the second terminal, and a wide part having a second width greater than the first width in the first direction. The wide part and the narrow part are arranged in a second direction intersecting the first direction. The second bump has, at the center, a first height from a bottom surface of the second terminal. The first height is greater than the first width.

A connection method according to one embodiment is a connection method of electrically connecting a disk-drive suspension and the electronic component to each other. The suspension includes a first terminal and a first bump arranged on top surface of the first terminal. The method comprises planarizing the second bump, aligning the suspension and the electronic component with each other in such a manner that the first bump and the second bump are close to each other, and a first plane including a top surface of the first terminal and a second plane including a top surface of the second terminal intersect each other, and melting the first bump and the second bump to thereby connect the first bump and the second bump to each other.

According to the present invention, it is possible to provide a suspension, an electronic component, and a method of connecting the suspension and the electronic component, all of which make it possible to excellently connect the terminals to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a schematic cross-sectional view of the terminal (narrow part) and bump along line IX-IX in FIG. 7.

FIG. 10 is a flowchart showing an example of a connection method of a suspension and electronic component.

DETAILED DESCRIPTION OF THE INVENTION

First Embodiment

A first embodiment will be described below by using FIGS. 1 to 14.

<Disk Drive>

Figure 1:
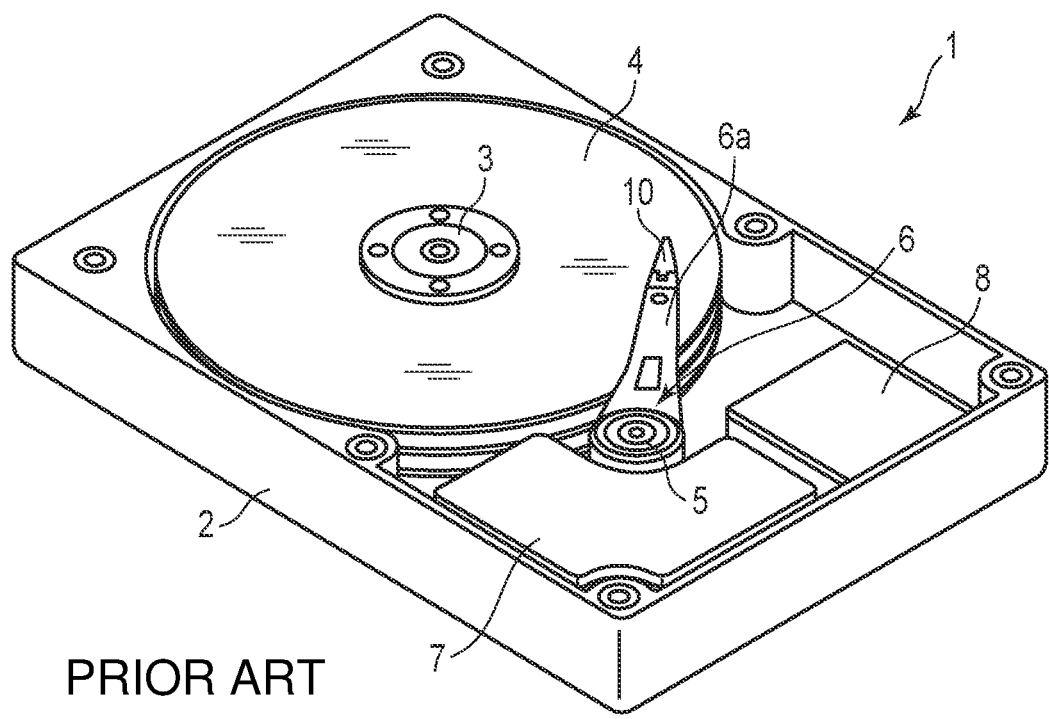
FIG. 1 is a schematic perspective view showing an example of a disk drive.

FIG. 1 is a schematic perspective view showing an example of a disk drive (HDD) 1. This disk drive 1 comprises a case 2, a plurality of disks 4 rotating around a spindle 3, a carriage 6 which can be turned around a pivot shaft 5, a positioning motor (voice coil motor) 7 configured to drive the carriage 6, and a connector 8. The case 2 is tightly closed with a lid not shown. The connector 8 is connected to a control board not shown.

Figure 2:
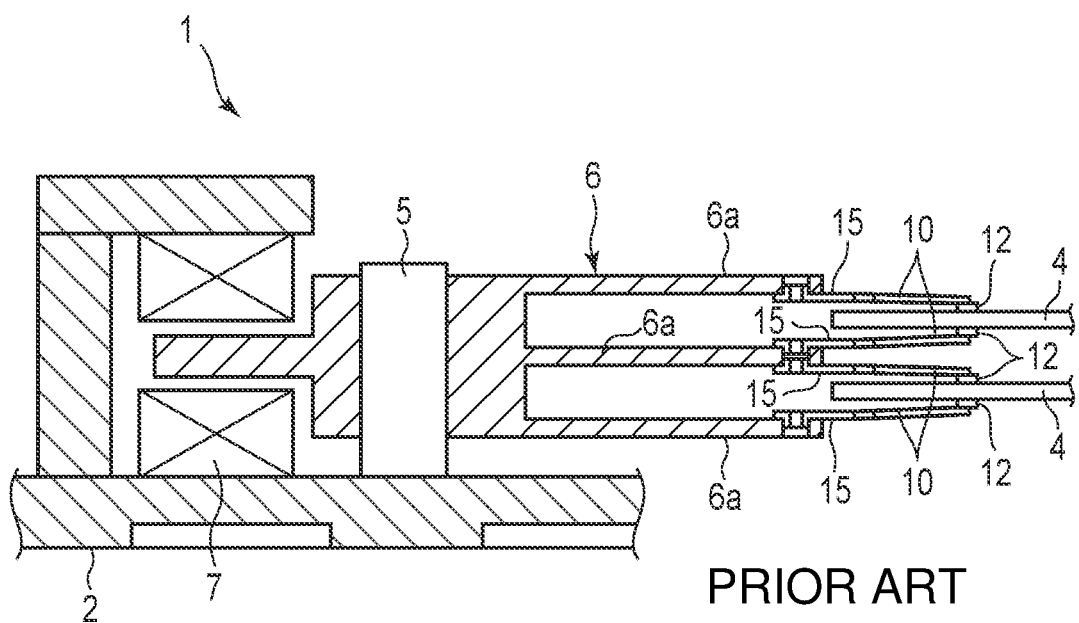
FIG. 2 is a schematic cross-sectional view showing a part of the disk drive.

FIG. 2 is a schematic cross-sectional view showing a part of the disk drive 1. As shown in FIG. 1 and FIG. 2, the carriage 6 is provided with a plurality of arms 6a (carriage arms). A suspension 10 is attached to a tip section of each arm 6a. A tip section of each suspension 10 is provided with a slider 12 constituting a magnetic head. The slider 12 carries out write of data to the disk 4 and read of data from the disk 4. When the disk 4 is rotated at a high rotational speed, air flows into a gap between the disk 4 and slider 12, thereby forming an air bearing.

When the carriage 6 is turned by the positioning motor 7, the suspension 10 is moved in a radial direction of the disk 4. Thereby, the slider 12 can be moved to a desired track of the disk 4.

<Suspension>

Figure 3:
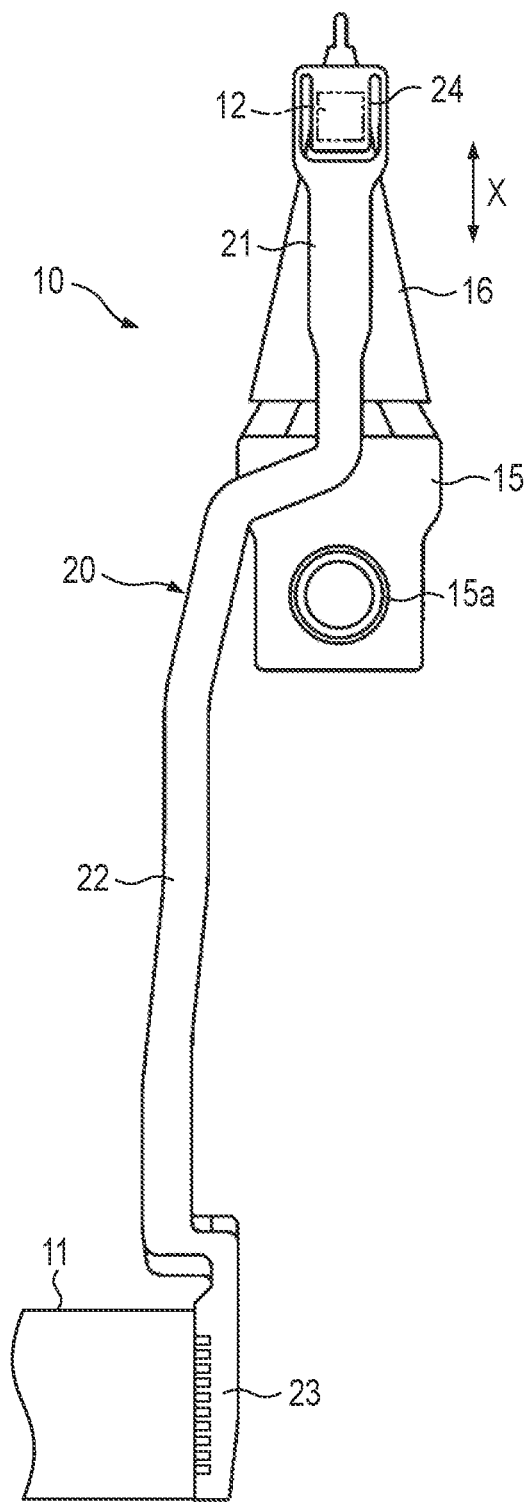
FIG. 3 is a schematic plan view showing an example of a head gimbal assembly provided with a suspension and slider.

FIG. 3 is a schematic plan view showing an example of a head gimbal assembly provided with a suspension 10 and a slider 12. The suspension 10 comprises a base plate 15, a load beam 16, and a flexure 20. The base plate 15 includes a boss section 15a. The boss section 15a is fixed to the arm 6a of the carriage 6 shown in FIG. 1 and FIG. 2.

Each of the load beam 16 and flexure 20 has a shape elongated in the longitudinal direction X of the suspension 10. For example, the load beam 16 is formed of a stainless steel plate. The flexure 20 includes a tip section 21 laid on top of the load beam 16 and tail section 22 extending from the tip section 21 in the backward direction (downward direction in FIG. 3) of the base plate 15.

A pad section 23 is provided at an end of the tail section 22. One end of the flexible printed circuit board 11 is connected to the pad section 23. The other end of the flexible printed circuit board 11 is connected to the connector 8 shown in FIG. 1. A tongue 24 functioning as a gimbal section capable of swinging is formed on the tip section 21. The slider 12 is mounted on the tongue 24.

Figure 4:
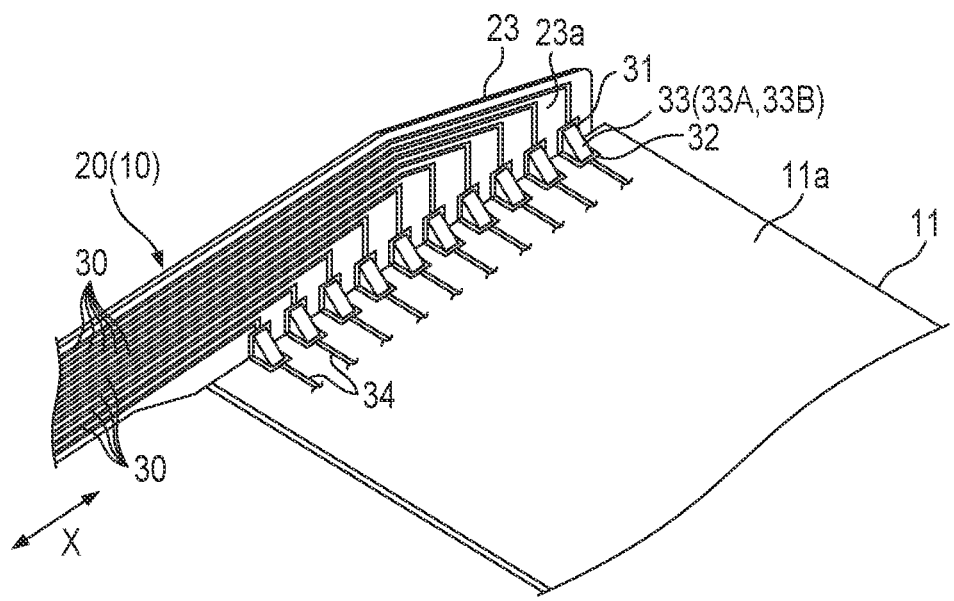
FIG. 4 is a schematic perspective view showing an example of a connection structure of a suspension and flexible printed circuit board.

FIG. 4 is a schematic perspective view showing an example of a connection structure of the suspension 10 and the flexible printed circuit board 11. For example, the flexure 20 comprises a base metal and an insulating layer covering one surface of the base metal. Furthermore, the flexure 20 comprises a plurality of wirings 30 formed on the insulating layer and a plurality of terminals 31 respectively connected to these wiring 30.

The plurality of terminals 31 are formed on one surface 23a of the tail section 22 and are arranged side by side at intervals in a direction approximately parallel to, for example, the longitudinal direction X.

The flexible printed circuit board 11 comprises a plurality of terminals 32 formed on one surface 11a thereof. The surface 11a intersects the surface 23a at a predetermined angle. In the example of FIG. 4, the surface 11a and surface 23a constitute perpendicularity. The terminals 32 are respectively connected to a plurality of wirings 34 provided on the flexible printed circuit board 11.

The plurality of terminals 32 are arranged side by side at intervals in a direction approximately parallel to, for example, the longitudinal direction X. The terminals 32 are connected to the corresponding terminals 31 through conductive connecting members 33. As will be described later, a bump 33A arranged on a terminal 31 before connection and a bump 33B arranged on a terminal 32 before connection are unified with each other after melting and are solidified, whereby the connecting member 33 is formed.

It should be noted that although in FIG. 4, ten pairs of terminals 31 and 32 are shown, the number of the terminals 31 or 32 is not limited to this example.

Figure 5:
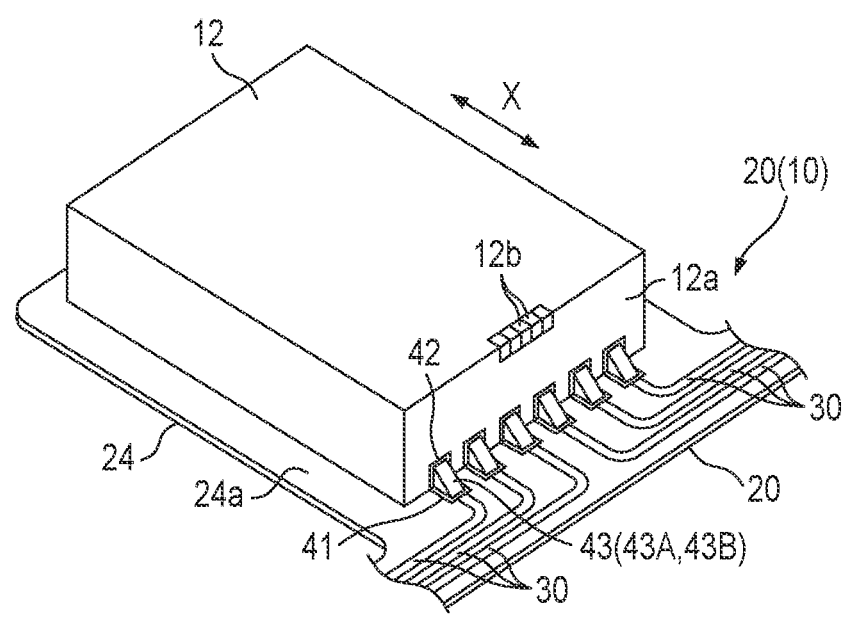
FIG. 5 is a schematic perspective view showing an example of a connection structure of a suspension and slider.

FIG. 5 is a schematic perspective view showing an example of a connection structure of the suspension 10 and the slider 12. In the example shown in FIG. 5, although the slider 12 has a shape of a rectangular parallelepiped, the shape of the slider 12 is not limited to this example. The slider 12 is mounted on the tongue 24.

Most of the aforementioned wirings 30 are formed along a route passing through the tail section 22 and tip section 21 of the flexure 20 and leading to the tongue 24. Part of the plurality of wirings 30 shown in FIG. 4 are connected to electronic components other than the slider 12 provided to the suspension 10 at, for example, the tip section 21. As one of such electronic components, for example, an actuator element configured to swing the tongue 24 can be named.

The flexure 20 comprises a plurality of terminals 41 formed on one surface 24a (surface on which the slider 12 is mounted) of the tongue 24. The plurality of terminals 41 are arranged side by side at intervals in a direction perpendicular to, for example, the longitudinal direction X.

The slider 12 has a side face 12a intersecting the longitudinal direction X. The side face 12a intersects the surface 24a at a predetermined angle. In the example of FIG. 5, the side face 12a and surface 24a constitute perpendicularity.

The slider 12 includes a plurality of elements 12b capable of converting a magnetic signal into an electric signal such as MR elements. Read of data from the disk 4 is carried out by these elements 12b. Further, the slider 12 includes a coil configured to generate a magnetic field to be used to write data to the disk 4.

The slider 12 further comprises a plurality of terminals 42 formed on the side face 12a thereof. These terminals 42 are arranged side by side at intervals in the direction orthogonal to, for example, the longitudinal direction X. The terminals 42 are respectively connected the corresponding terminals 41 through conductive connecting members 43. As will be described later, a bump 43A arranged on a terminal 41 before connection and bump 43B arranged on a terminal 42 before connection are unified with each other after melting and are solidified, whereby the connecting member 43 is formed.

It should be noted that although in FIG. 5, six pairs of terminals 41 and 42 are shown, the number of the terminals 41 or 42 is not limited to this example.

<Structure of Terminal>

Figure 6:
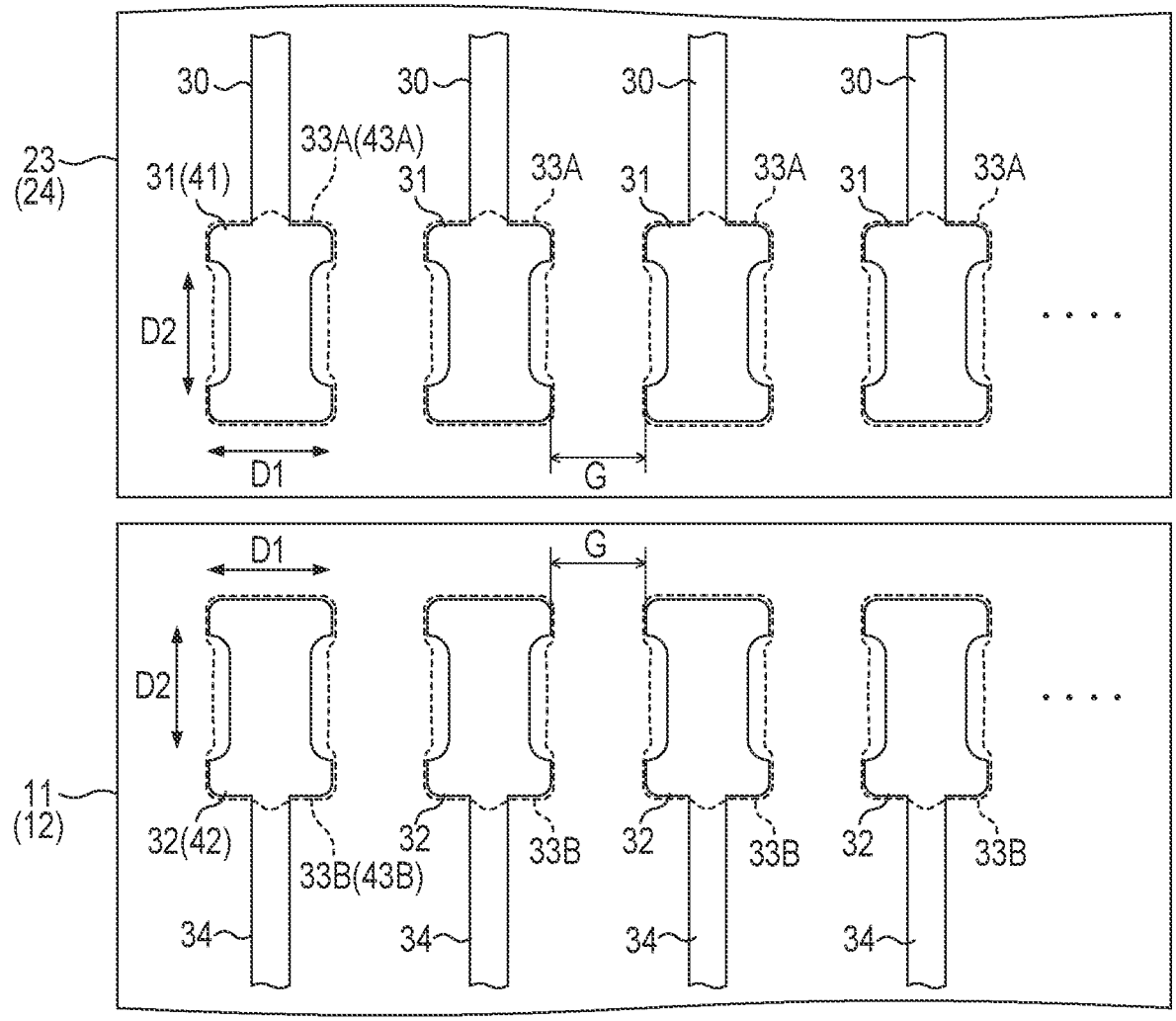
FIG. 6 is a schematic plan view showing an example of terminals according to a first embodiment.

FIG. 6 is a schematic plan view showing an example of terminals 31 and 32 before connection according to this embodiment. The plurality of terminals 31 provided on a pad section 23 are arranged side by side at given intervals G in a first direction D1. The terminal 31 has a shape elongated in a second direction D2 intersecting the first direction D1. In this embodiment, the first direction D1 and second direction D2 are orthogonal to each other. The first direction D1 is parallel to, for example, the longitudinal direction X.

A wiring 30 is connected to one end of each terminal 31 in the second direction D2. A conductive bump 33A is arranged on each terminal 31. The bump 33A is formed of a metallic material. The metallic material for the bump 33A is, for example, an alloy, and preferably, solder.

The plurality of terminals 32 provided on the flexible printed circuit board 11 are, as in the case of the terminals 31, arranged side by side at given intervals G in the first direction D1. The shape of the terminal 32 is identical to, for example, the terminal 31. A wiring 34 is connected to one end of each terminal 32 in the second direction D2. A conductive bump 33B is arranged on each terminal 32. The bump 33B is formed of a material identical to the bump 33A.

It should be noted that shapes and arrangement aspect identical to the terminals 31 and 32 can be applied to the terminals 41 provided on the tongue 24 and terminals 42 provided on the slider 12. A bump 43A identical to the bump 33A is arranged on the terminal 41 before being connected to the terminal 42. A bump 43B identical to the bump 33B is arranged on the terminal 42 before being connected to the terminal 41. In FIG. 6, the reference symbols of the tongue 24, slider 12, terminals 41 and 42, and bumps 43A and 43B are respectively written down along with the reference symbols of the corresponding elements.

Hereinafter, the structures of the terminal 31 and bump 33A will be described by using FIGS. 7 to 9. The structures identical to the terminal 31 and bump 33A to be described by using FIGS. 7 to 9 can respectively be applied to the terminal 32 and bump 33B. Further, the structures identical to the terminal 31 and bump 33A to be described by using FIGS. 7 to 9 can also be respectively applied to the terminals 41 and 42 and bumps 43A and 43B which are to be respectively arranged on those terminals 41 and 42.

Figure 7:
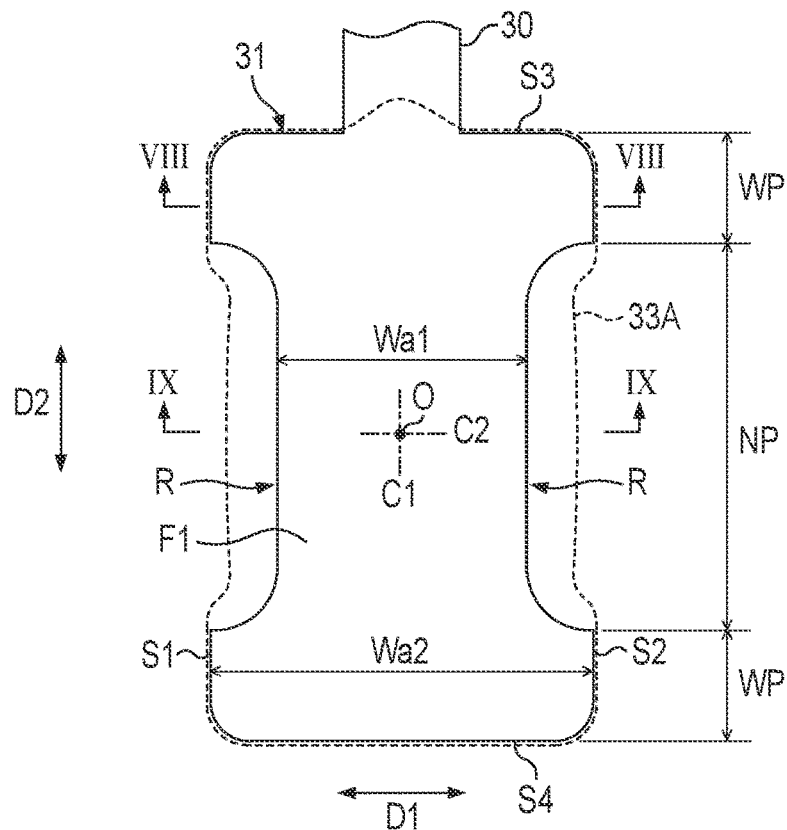
FIG. 7 is a schematic plan view of an enlarged terminal.

FIG. 7 is a schematic plan view of the enlarged terminal 31. The terminal 31 has a first side S1 and second side S2 each intersecting the first direction D1, and third side S3 and fourth side S4 each intersecting the second direction D2. These sides S1, S2, S3, and S4 constitute the external shape of the terminal 31. The first side S1 and second side S2 are respectively longer than the third side S3 and fourth side S4. The wiring 30 is connected to the third side S3.

Each of the first side S1 and second side S2 has a concave section R recessed toward the center O of the terminal 31 in the first direction D1. The center O is a point at which a center line C1 of the terminal 31 in the first direction D1 and a center line C2 of the terminal 31 in the second direction D2 intersect each other. The center line C1 is parallel to the second direction D2 and the center line C2 is parallel to the first direction D1. Although the terminal 31 has an external shape line-symmetric with respect to, for example, each of the center lines C1 and C2, the external shape thereof is not limited to this example.

The terminal 31 is provided with the concave sections R, whereby, in the external shape of the terminal 31, the central section thereof between both end sections in the second direction D2 is constricted to a width less than the both end sections. More specifically, the terminal 31 includes a narrow part NP and a pair of wide parts WP. The narrow part NP is a part corresponding to the concave sections R and is positioned between the pair of wide parts WP in the second direction D2. That is, the narrow part NP and wide parts WP are arranged in the second direction D2. The narrow part NP includes the center O.

The narrow part NP has a width Wa1 (first width) in the first direction D1. Each of the wide parts WP has a width Wa2 (second width) in the first direction D1. The width Wa2 is greater than the width Wa1 (Wa1<Wa2). In the example of FIG. 7, the length of the narrow part NP in the second direction D2 is greater than the length of each of the wide parts WP in the second direction D2. However, the length of the narrow part NP in the second direction D2 may also be less than the length of each of the wide parts WP in the second direction D2.

The bump 33A indicated by a broken line is arranged on the top surface F1 of the terminal 31 in the narrow part NP and in each of the wide parts WP. The bump 33A outwardly projects from the first side S1 and second side S2 in the first direction D1 at the concave sections R.

Figure 8:
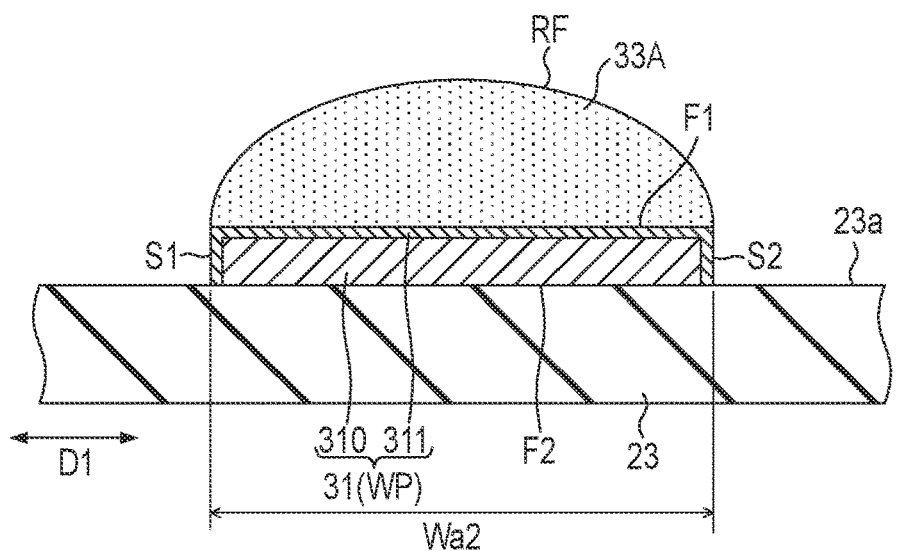
FIG. 8 is a schematic cross-sectional view of the terminal (wide part) and bump along line VIII-VIII in FIG. 7.

FIG. 8 is a schematic cross-sectional view of the terminal 31 (wide part WP) and bump 33A along line VIII-VIII in FIG. 7. The terminal 31 comprises a conductive layer 310 and a plated layer 311 covering the top surface and side face of the conductive layer 310. For example, the conductive layer 310 and plated layer 311 are formed of metallic materials different from each other. The wiring 30 is formed of a metallic material identical to, for example, the conductive layer 310 in such a manner as to be integral with the conductive layer 310.

A bottom surface F2 of the terminal 31 is in contact with the surface 23a of the pad section 23. The surface 23a corresponds to a surface of the insulating layer such as polyimide. The bottom surface F2 corresponds to the surface of the conductive layer 310 not covered with the plated layer 311. The top surface F1 of the terminal 31 corresponds to the surface of the plated layer 311.

The bump 33A covers the top surface F1. In the example of FIG. 8, although the bump 33A is not in contact with the side face of the terminal 31 at the first side S1 and second side S2, at least part of the side face at the first side S1 and second side S2 may also be covered with the bump 33A. In the cross section of FIG. 8, the surface RF of the bump 33A has a shape corresponding to a part of an ellipse.

FIG. 9 is a schematic cross-sectional view of the terminal 31 (narrow part NP) and bump 33A along line IX-IX in FIG. 7. This cross section is that along the center line C2 shown in FIG. 7 and passes through the center O.

As described above, the width Wa1 of the narrow part NP is less than the width Wa2 of the wide part WP, and hence the bump 33A is upwardly swollen. Thereby, the shape of the surface RF is made nearer to an exact circle as compared with the example of FIG. 8.

At the center O, the bump 33A has a height Z1 (first height). The height Z1 is that set on the basis of the bottom surface F2 of the terminal 31 (or surface 23a). That is, the height Z1 corresponds to the distance from the bottom surface F2 to the surface RF at the center O. The height Z1 can also be expressed as a height obtained by adding the bump 33A and terminal 31 together. The height Z1 is greater than the width Wa1 (Z1>Wa1).

For example, the height of the bump 33A is greatest at the center O. In this case, the height Z1 is the maximum value of the height of the bump 33A. For example, in the cross section of the bump 33A along the center line C1 shown in FIG. 7, the height of the bump 33A gradually becomes less from the center O to the third side S3 or to the fourth side S4. It can also be said that, in the above cross section, the height of the bump 33A in the narrow part NP is, as a whole, greater than the height of the bump 33A in each wide part WP.

In the cross section of FIG. 9, the bump 33A has a width Wb1. For example, the width Wb1 is greater than the width Wa1 (Wb1>Wa1). It should be noted that as can be seen also from the external shape of the bump 33A of FIG. 7, the width of the part of the bump 33A arranged in the wide part WP in the first direction D1 is greater than the width of the part of the bump 33A arranged in the narrow part NP in the first direction D1.

A layer of a material serving as the basis of the bump 33A such as solder or the like is formed on the top surface F1 of the terminal 31 by screen printing, the layer is melted (reflowed) in a furnace, and is then solidified again, whereby the bump 33A is formed. The surface RF of the bump 33A is made globular as shown in FIG. 8 and FIG. 9 by the surface tension at the time of the molten state.

In FIG. 9, the external shapes of a terminal 31X and bump 33X according to a comparative example are shown by chain lines. The terminal 31X includes no concave sections R. That is, the terminal 31X shown in FIG. 9 has a shape identical to the terminal 31 in the cross section of FIG. 8. The width of the bump 33X formed on such a terminal 31X becomes greater than the width Wb1.

<Method of Connecting Suspension and Electronic Component>

FIG. 10 is a flowchart showing an example of a method of connecting the suspension 10 and each of the electronic components (flexible printed circuit board 11 and slider 12) to each other.

First, the suspension 10, flexible printed circuit board 11, and slider 12 are prepared (step ST1). In the suspension 10, the bumps 33A described by using FIGS. 7 to 9 are arranged on the terminals 31. The bumps 33B, 43A, and 43B which are identical to the bumps 33A are respectively arranged also on the terminals 32 of the flexible printed circuit board 11, terminals 41 of the suspension 10, and terminals 42 of the slider 12.

Subsequently, the bumps 33A arranged on the terminals 31, the bumps 33B arranged on the terminals 32, the bumps 43A arranged on the terminals 41, and the bumps 43B arranged on the terminals 42 are planarized (step ST2). This planarization is carried out by, for example, mechanically pressing (stamping) the bumps 33A, 33B, 43A, and 43B.

Figure 11:
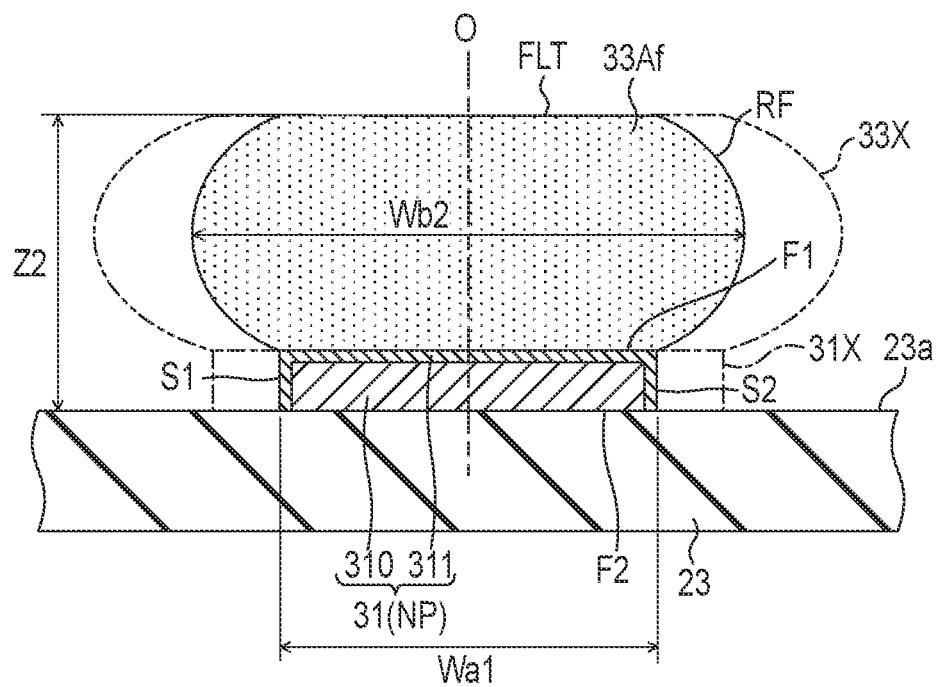
FIG. 11 is a schematic cross-sectional view showing a terminal and planarized bump.

FIG. 11 is a schematic cross-sectional view showing the terminal 31 and planarized bump 33A. This cross section is that along the center line C2 as in the case of FIG. 9 and passes through the center O. Hereinafter, the planarized bump 33A is referred to as a bump 33Af.

In the example of FIG. 11, a flat surface FLT is formed on the surface RF of the bump 33Af. The flat surface FLT is parallel to, for example, the bottom surface F2. At the center O, the bump 33Af has a height Z2 (second height). The height Z2 is, as in the case of the height Z1, that set on the basis of the bottom surface F2 of the terminal 31. That is, the height Z2 corresponds to the distance from the bottom surface F2 to the surface RF (flat surface FLT) at the center O.

For example, the height Z2 is less than the width Wa1 of the terminal 31 (Z2<Wa1). That is, although the height of the bump 33A at the center O is greater than the width Wa1 before the planarization, the height becomes less than the width Wa1 after the planarization. It is desirable that the height Z2 be less than the height Z1 by 15% or more.

In the cross section of FIG. 11, the bump 33Af has a width Wb2. The width Wb2 is greater than the width Wb1 (Wb1<Wb2). That is, the width of the bump 33A in the first direction D1 is increased by the planarization.

It should be noted that the flat surface FLT covers not only the surface RF of the bump 33Af at the narrow part NP but also the surface RF at the wide parts WP. However, at the wide parts WP, the height of the bump 33A is less than the height thereof at the narrow part NP. Accordingly, the rate of increase from the width of the bump 33A to the width of the bump 33Af at the wide part WP is less than the rate of increase from the width of the bump 33A to the width of the bump 33Af at the narrow part NP.

The relationship between the planarized bump 33B and terminal 32, relationship between the planarized bump 43A and terminal 41, and relationship between the planarized bump 43B and terminal 42 are identical to the relationship between the bump 33Af and terminal 31 shown in FIG. 11.

After the bumps 33A, 33B, 43A, and 43B are planarized, the suspension 10 and flexible printed circuit board 11, and suspension 10 and slider 12 are respectively aligned with each other in such a manner as to be in a fit state to be connected to each other (step ST3 of FIG. 10).

Figure 12:
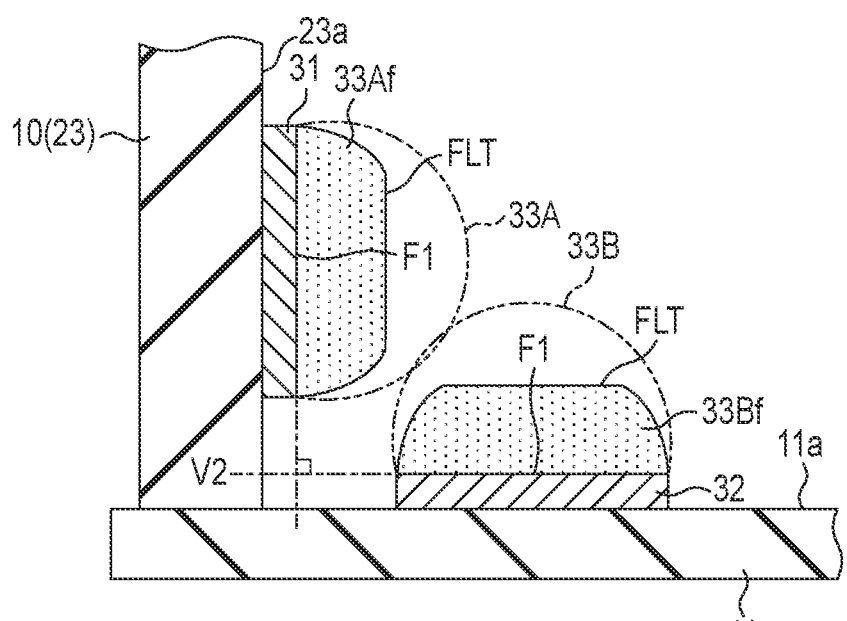
FIG. 12 is a schematic cross-sectional view of a suspension and flexible printed circuit board which are aligned with each other.

FIG. 12 is a schematic cross-sectional view of the suspension 10 (pad section 23) and flexible printed circuit board 11 which are aligned with each other. Hereinafter, the planarized bump 33B is referred to as a bump 33Bf. In the example shown in FIG. 4, the surface 11a of the flexible printed circuit board 11 and surface 23a of the pad section 23 constitute perpendicularity. Thus, in step ST3 too, the pad section 23 and flexible printed circuit board 11 are aligned with each other in such a manner that the surfaces 11a and 23a constitute perpendicularity.

From another point of view, the pad section 23 and flexible printed circuit board 11 are aligned with each other in such a manner that a virtual plane V1 (first plane) including the top surface F1 of the terminal 31 and virtual plane V2 (second plane) including the top surface F1 of the terminal 32 intersect each other. In the example of FIG. 12, these virtual planes V1 and V2 are orthogonal to each other.

In the state where the pad section 23 and the flexible printed circuit board 11 are aligned with each other, the bumps 33Af and 33Bf are adjacent to each other. The bumps 33Af and 33Bf may be separate from each other as shown in FIG. 12. Further, the bumps 33Af and 33Bf may also be in contact with each other.

The suspension 10 (tongue 24) and the slider 12 are aligned with each other in such a manner that the terminals 41 and 42 are in a relationship identical to the terminals 31 and 32 shown in FIG. 12. At this time, the bumps 43A and 43B adjacent to each other may be separate from each other or may be in contact with each other.

After the suspension 10 and flexible printed circuit board 11, and the suspension 10 and slider 12 are respectively aligned with each other, the bumps 33A, 33B, 43A, and 43B are heated at, for example, a limited part (locally), whereby these bumps are melted (reflowed) (step ST4 of FIG. 10).

In FIG. 12, the shapes of the molten bumps 33A and 33B are shown by chain lines. By being melted, the shapes of the bumps 33A and 33B are made closer to their shapes before being planarized in step ST2. Thereby, the molten bumps 33A and 33B come into contact with each other and are unified with each other.

Figures 13, 14:
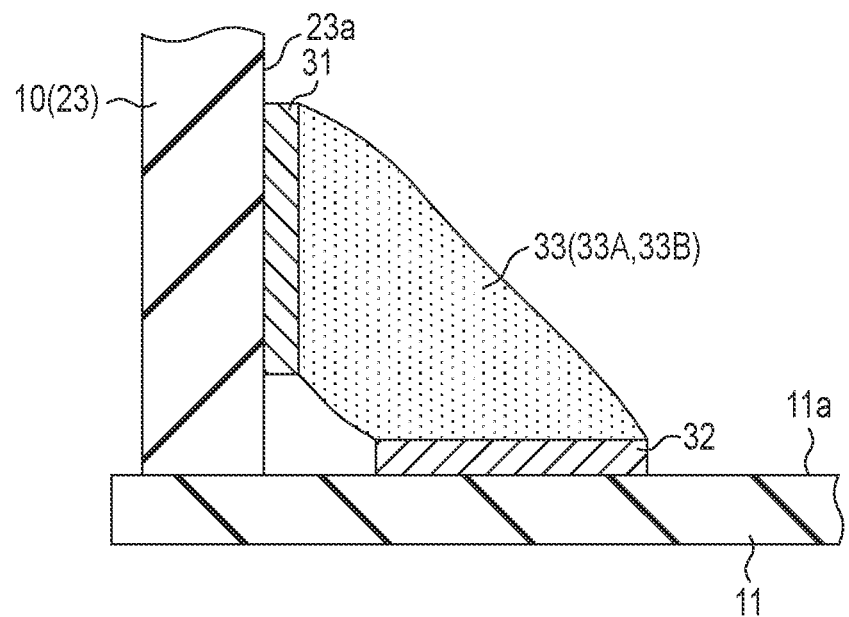
FIG. 13 is a schematic cross-sectional view showing a state where bumps unified with each other after melting are cooled and solidified.
FIG. 14 is a table showing examples and comparative example of a terminal and bump.

FIG. 13 is a schematic cross-sectional view showing a state where the bumps 33A and 33B unified with each other are cooled and solidified. When the unified bumps 33A and 33B are solidified, the aforementioned connecting member 33 is formed. Thereby, the terminals 31 and 32 are electrically connected to each other through the connecting member 33.

The molten bumps 43A and 43B are also solidified in the unified state in a similar way and the aforementioned connecting member 43 is formed. Thereby, the terminals 41 and 42 are electrically connected to each other through the connecting member 43.

Advantageous Effects of Embodiment

The advantageous effects obtained from this embodiment will be exemplified below. It should be noted that although in the following description, attention is mainly paid to the terminal 31 and bump 33A, the same advantageous effects can also be obtained with respect to the combinations of the terminal 32 and bump 33B, the terminal 41 and bump 43A, and the terminal 42 and bump 43B.

When it is necessary to arrange the terminals 31 at high densities, the interval G shown in FIG. 6 becomes less. In this case, the risk of the bumps 33A arranged on adjacent terminals 31 being short-circuited is enhanced. In particular, in the case where the bumps 33A are planarized as in the case of this embodiment, this risk becomes conspicuous. Supposing that the terminal 31 has a simple rectangular shape, the width of the bump 33A becomes largest at the central part thereof in the second direction D2 both before and after the planarization.

Conversely, in this embodiment, the terminal 31 includes the concave sections R. Thereby, it is possible to reduce the width of the bump 33A at the central part (narrow part NP) both before and after the planarization. As a result, it is possible to reduce the risk of the bumps 33A arranged on the adjacent terminals 31 being short-circuited.

As another method of reducing the risk of the short circuit, reducing the amount of the bump 33A to be arranged on the terminal 31 is conceivable. However, in this case, the height of the bump 33A before planarization is also reduced. Accordingly, there is a possibility of a defect such as occurrence of no contact between the molten bumps 33A and 33B after alignment occurring in the connection of the terminals 31 and 32.

Conversely, in this embodiment, the height Z1 of the bump 33A before planarization at the center O is greater than the width Wa1 of the terminal 31 at the narrow part NP. When the height Z1 is secured to such a degree, the bumps 33A and 33B which are melted after planarization are satisfactorily connected to each other.

In this embodiment, the bumps 33A and 33B are planarized before the suspension 10 and flexible printed circuit board 11 are aligned with each other. Supposing that alignment is carried without carrying out the planarization, there is a possibility of the alignment accuracy being lowered by the interference of the bumps 33A and 33B. Conversely, when the bumps 33A and 33B are planarized in advance, the bumps 33Af and 33Bf after planarization hardly interfere with the alignment, and hence it is possible to enhance the alignment accuracy. Even when a gap exists between the bumps 33Af and 33Bf before being melted, the shapes of the bumps 33Af and 33Bf are restored to their original shapes before the planarization and their heights are increased. Accordingly, it is possible to connect the bumps 33A and 33B to each other.

The terminal 31X according to the comparative example shown in FIG. 9 has no concave sections R as described previously. Supposing that the bump 33X to be arranged on the terminal 31X has the height Z1 identical to the bump 33A at the center O, in the vicinity of the cross section shown in FIG. 9, it is possible to make the amount of the material constituting the bump 33A less than the bump 33X. As a result, it is possible to reduce the amount of the material constituting the bump 33A while making the height Z1 of the bump 33A at the center O larger.

In this embodiment, the method of increasing the height of the bump 33A in the vicinity of the center O by providing the narrow part NP between the wide parts WP has been disclosed. As another method of increasing the height of the bump 33A in the vicinity of the center O, forming the terminal 31 in such a manner that the terminal 31 has, as a whole, a width equivalent to the narrow part NP is conceivable. However, in this case, when the bump 33A is formed by screen printing, and is then melted in order that the bump 33A may have a shape as shown in FIG. 9, there is a possibility of the molten bump 33A being spilled from the terminal 31.

Conversely, when the wide parts WP are provided as in the case of this embodiment, part of the molten bump 33A that cannot be held by only the narrow part NP flows into the wide parts WP. Thereby, it is made hard for the molten bump 33A to be spilled from the terminal 31. In this embodiment, it can also be understood that it has been aimed to widen the terminal 31 at both end sections in the second direction D2 in order that the molten bump 33A may not be spilled from the terminal 31 while making the width of the terminal 31 smaller to thereby secure the sufficient height of the bump 33A.

Besides the effects described above, various appropriate effects can be obtained from this embodiment.

EXAMPLES

FIG. 14 is a table showing examples 1 and 2 of the terminal 31 and bump 33A and comparative example. Each of the terminals 31 according to the examples 1 and 2 has a shape shown in FIG. 7. The terminal 31X according to the comparative example has no concave sections R. The width of the wide part WP of the terminal 31 according to each of the example 1 and 2 in the first direction D1 is identical to the width of the terminal 31X in the first direction D1. The length of the terminal 31 according to each of the examples 1 and 2 in the second direction D2 is identical to the length of the terminal 31X in the second direction D2.

The width Wa1 (see FIG. 9) of the terminal 31 according to the example 1 is 0.145 mm, and width Wa2 (see FIG. 8) of the terminal 31 is 0.185 mm. A bump 33A a height Z1 (see FIG. 9) of which at the center O is 0.160 mm was formed on the terminal 31.

The width Wa1 of the terminal 31 according to the example 2 is 0.145 mm, and width Wa2 of this terminal 31 is 0.215 mm. A bump 33A a height Z1 of which at the center O is 0.151 mm was formed on this terminal 31.

The terminal 31X according to the comparative example has a width of 0.185 mm at any position in the second direction D2. A bump 33X a height Z1 of which at the center O is 0.163 mm was formed on this terminal 31X.

The width Wb1 (see FIG. 9) of the bump 33A according to the example 1 at the center O became 0.205 mm, and width Wb2 (see FIG. 11) of the bump 33A (bump 33Af) after planarization at the center O became 0.303 mm. The width Wb1 of the bump 33A according to the example 2 at the center O became 0.193 mm, and width Wb2 of the bump 33A (bump 33Af) after planarization at the center O became 0.275 mm.

On the other hand, the width Wb1 of the bump 33X according to the comparative example at the center O became 0.229 mm, and width Wb2 of the bump 33X after planarization at the center O became 0.337 mm.

The width Wb1 of each of the bumps 33A according to the examples 1 and 2 is less than the width Wb1 of the bump 33X according to the comparative example. Further, the width Wb2 of each of the bumps 33A (bumps 33Af) according to the examples 1 and 2 is less than the width Wb2 of the bump 33X according to the comparative example.

From these facts, it can be seen that in the terminals 31 and bumps 33A according to the examples 1 and 2, the risk of the adjacent bumps 33A being short-circuited is further more reduced than the comparative example both before and after the planarization.

It should be noted that in each of the examples 1 and 2, a bump 33A having a satisfactory shape that prevents the molten bump 33A from being spilled from the terminal 31 could be formed. Furthermore, when the bump 33A was connected to a bump 33B of another terminal 32 by the connection method of this embodiment, a connecting member 33 having a satisfactory shape could be formed.

All of the combinations of the terminal 31 and bump 33A, the terminal 32 and bump 33B, the terminal 41 and bump 43A, and the terminal 42 and bump 43B do not necessarily have the same structure. For example, the terminals 31, 32, 41, and 42 may each have different widths Wa1 and Wa2. Further, the bumps 33A, 33B, 43A, and 43B before planarization may each have different widths Wb1 and heights Z1, and bumps 33A, 33B, 43A, and 43B after planarization may each have different widths Wb2 and heights Z2.

In the first embodiment, the case where each of the combinations of the terminal 31 and bump 33A, terminal 32 and bump 33B, the terminal 41 and bump 43A, and the terminal 42 and bump 43B has the structure described by using FIGS. 7 to 9 has been exemplified. However, it is not always necessary to apply the above-mentioned structure to all the combinations of the terminals and bumps. Some embodiments based on this viewpoint will be disclosed below. In each of the embodiments, configurations not particularly mentioned are identical to the first embodiment.

Second Embodiment

In a second embodiment, the terminal 31 and bump 33A of the suspension 10 have the structure described by using FIGS. 7 to 9. On the other hand, the terminal 32 and bump 33B of the flexible printed circuit board 11 have no structure described by using FIGS. 7 to 9. For example, the terminal 32 has a rectangular shape in which the width in the first direction D1 is constant. Despite such a configuration, it is possible to obtain the effect identical to the first embodiment with respect to the terminal 31 and bump 33A.

Third Embodiment

In a third embodiment, the terminal 41 and bump 43A of the suspension 10 have the structure described by using FIGS. 7 to 9. On the other hand, the terminal 42 and bump 43B of the slider 12 have no structure described by using FIGS. 7 to 9. For example, the terminal 42 has a rectangular shape in which the width in the first direction D1 is constant. Despite such a configuration, it is possible to obtain the effect identical to the first embodiment with respect to the terminal 41 and bump 43A.

Fourth Embodiment

In a fourth embodiment, the terminal 31 and bump 33A of the suspension 10 have no structure described by using FIGS. 7 to 9. On the other hand, the terminal 32 and bump 33B of the flexible printed circuit board 11 have the structure described by using FIGS. 7 to 9. For example, the terminal 31 has a rectangular shape in which the width in the first direction D1 is constant. Despite such a configuration, it is possible to obtain the effect identical to the first embodiment with respect to the terminal 32 and bump 33B.

Fifth Embodiment

In a fifth embodiment, the terminal 41 and bump 43A of the suspension 10 have no structure described by using FIGS. 7 to 9. On the other hand, the terminal 42 and bump 43B of the slider 12 have the structure described by using FIGS. 7 to 9. For example, the terminal 41 has a rectangular shape in which the width in the first direction D1 is constant. Despite such a configuration, it is possible to obtain the effect identical to the first embodiment with respect to the terminal 42 and bump 43B.

Modified Example

The shape of the terminal 31 shown in FIG. 7 is only an example of a shape applicable to the terminals 31, 32, 41, and 42. Various other shapes are applicable to the terminals 31, 32, 41, and 42. Hereinafter, first to third modified example associated with the shape of the terminal 31 will be disclosed. The shapes of the terminal 31 according to these modified examples are also applicable to the terminals 32, 41, and 42.

Figure 15:
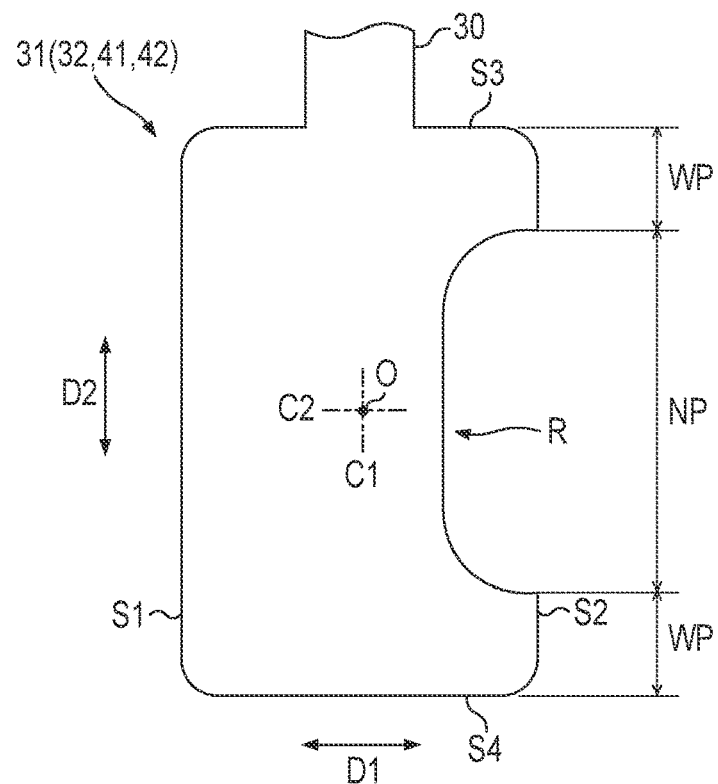
FIG. 15 is a schematic plan view of a terminal according to a first modified example.

FIG. 15 is a schematic plan view of the terminal 31 according to a first modified example. In the first modified example, the second side S2 is provided with a concave section R, and first side S1 is provided with no concave section R. Despite such a configuration, a narrow part NP and wide parts WP are formed on the terminal 31. Accordingly, it is possible to obtain effects similar to the first embodiment.

Figure 16:
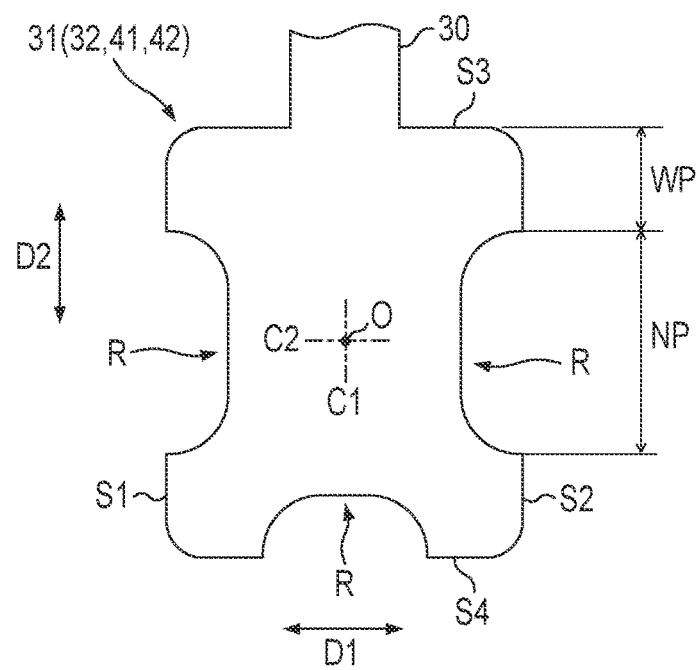
FIG. 16 is a schematic plan view of a terminal according to a second modified example.

FIG. 16 is a schematic plan view of the terminal 31 according to a second modified example. In the second modified example, each of the first side Sl, second side S2, and fourth side S4 is provided with a concave section R. When the concave section R is also formed at the fourth side S4 as described above, it is possible to further increase the height Z1 of the bump 33A at the center O.

Figure 17:
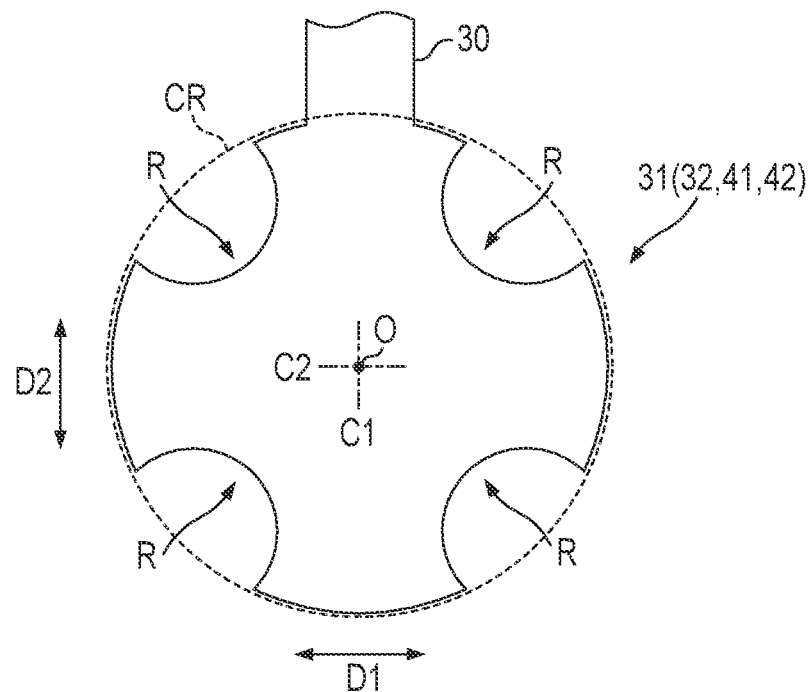
FIG. 17 is a schematic plan view of a terminal according to a third modified example.

FIG. 17 is a schematic plan view of the terminal 31 according to a third modified example. In the third modified example, the terminal 31 has an outer diameter (external shape) along a circle CR indicated by a broken line. Furthermore, the external shape of the terminal 31 has four concave sections R recessed toward the center O. The concave section R is, for example, semicircular. Even when the terminal 31 has such a shape, it is possible to increase the height Z1 of the bump 33A at the center O.

The cross-sectional structure of the terminal 31, 32, 41 or 42 is not limited to the example shown in FIG. 8 and FIG. 9.

Figure 18:
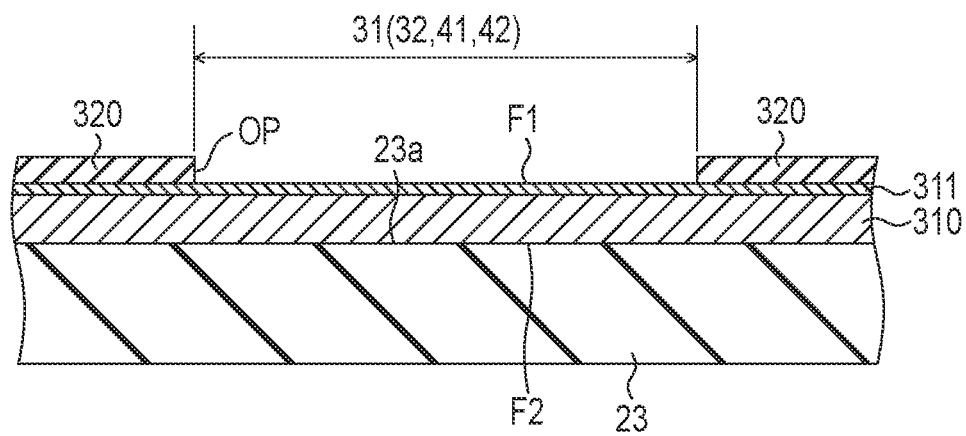
FIG. 18 is a schematic cross-sectional view showing another structure applicable to a terminal.

FIG. 18 is a schematic cross-sectional view showing another structure applicable to the terminal 31. The structure of the terminal 31 shown in FIG. 18 is also applicable to the terminals 32, 41, and 42.

In the example of FIG. 18, a conductive layer 310 is formed on the surface 23a of the pad section 23, and the conductive layer 310 is covered with a plated layer 311. Furthermore, an insulating layer 320 is formed on the plated layer 311. The insulating layer 320 includes an opening OP. The plated layer 311 is exposed from the insulating layer 320 through the opening. This exposed area corresponds to the terminal 31.

The shape identical to the terminal 31 in each of the embodiments described above can also be applied to the shape of the terminal 31 defined by the opening OP of the insulating layer 320 as described above. Thereby, it is possible to obtain effects similar to the embodiments described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk-drive suspension comprising:
   a load beam;
   a flexure provided on top of the load beam;
   a first terminal provided on the flexure; and
   a first bump provided on a top surface of the first terminal, wherein:
   the first terminal includes:
      a narrow part having a first width in a first direction and including a center of the first terminal in the first direction and a second direction intersecting the first direction; and
      a pair of wide parts each having a second width in the first direction greater than the first width,
   the narrow part is positioned between the pair of wide parts in the second direction,
   the first bump has, at the center, a first height from a bottom surface of the first terminal, and
   the first height is greater than the first width.

2. The disk-drive suspension of claim 1, wherein:
   the first terminal includes a first side and a second side each intersecting the first direction, and
   at least one of the first side and the second side includes a concave section recessed in the first direction at the narrow part.

3. The disk-drive suspension of claim 1, wherein the first height is less than the second width.

4. A connection method of electrically connecting the disk-drive suspension of claim 1 and an electronic component to each other, the electronic component including a second terminal and a second bump provided on a top surface of the second terminal, and the method comprising:
   planarizing the first bump;
   aligning the suspension and the electronic component with each other in such a manner that (i) the first bump and the second bump are adjacent to each other, and (ii) a first plane including the top surface of the first terminal and a second plane including the top surface of the second terminal intersect each other; and
   melting the first bump and the second bump to thereby connect the first bump and the second bump to each other.

5. The connection method of claim 4, wherein:
   the planarized first bump has, at the center, a second height from the bottom surface of the first terminal, and
   the second height is less than the first height by at least 15%.

6. The connection method of claim 5, wherein the second height is less than the first width.

7. The connection method of claim 4, wherein the electronic component comprises one of a flexible printed circuit board and a slider constituting a magnetic head.

8. An electronic component electrically connectable to a disk-drive suspension, the electronic component comprising:

a second terminal; and
a second bump arranged on a top surface of the second terminal,
wherein:
the second terminal includes:
- a narrow part having a first width in a first direction and including a center of the second terminal in the first direction and a second direction intersecting the first direction, and
- a pair of wide parts each having a second width greater than the first width in the first direction, the narrow part is positioned between the pair of wide parts in the second direction,
the second bump has, at the center, a first height from a bottom surface of the second terminal, and
the first height is greater than the first width.

9. The electronic component of claim 8, wherein:
the second terminal includes a first side and a second side each intersecting the first direction, and
at least one of the first side and the second side includes a concave section recessed in the first direction at the narrow part.

10. The electronic component of claim 8, wherein the first height is less than the second width.

11. A connection method of electrically connecting a disk-drive suspension and the electronic component of claim 9 to each other, the suspension including a first terminal and a first bump arranged on a top surface of the first terminal, and the method comprising:
- planarizing the second bump;
- aligning the suspension and the electronic component with each other in such a manner that (i) the first bump and the second bump are adjacent to each other, and (ii) a first plane including the top surface of the first terminal and a second plane including the top surface of the second terminal intersect each other; and
- melting the first bump and the second bump to thereby connect the first bump and the second bump to each other.

12. The connection method of claim 11, wherein:
the planarized second bump has, at the center, a second height from a bottom surface of the second terminal, and
the second height is less than the first height by at least 15%.

13. The connection method of claim 12, wherein the second height is less than the first width.

14. The connection method of claim 11, wherein the electronic component comprises one of a flexible printed circuit board and a slider constituting a magnetic head.

* * * * *